(12) United States Patent
Efstathiou et al.

(10) Patent No.: US 8,114,369 B2
(45) Date of Patent: Feb. 14, 2012

(54) CATALYST CONTAINING PLATINUM AND PALLADIUM FOR THE SELECTIVE REDUCTION OF NOX WITH HYDROGEN (H2-SCR)

(75) Inventors: Angelos M. Efstathiou, Strovolos (CY); Petros G. Savva, Aglandjia (CY); Costas N. Costa, Limassol (CY)

(73) Assignees: Linde Aktiengesellschaft, Munich (DE); University of Cyprus, Nicosia (CY)

( * ) Notice: Subject to any disclaimer, the term of this patent is extended or adjusted under 35 U.S.C. 154(b) by 0 days.

(21) Appl. No.: 12/578,783

(22) Filed: Oct. 14, 2009

(65) Prior Publication Data
US 2010/0092360 A1    Apr. 15, 2010

(30) Foreign Application Priority Data
Oct. 15, 2008    (EP) .................................... 08018087

(51) Int. Cl.
*B01D 53/56*    (2006.01)
*B01D 53/94*    (2006.01)
*B01J 8/02*    (2006.01)
*C01B 21/00*    (2006.01)
*C01B 23/00*    (2006.01)
*C01B 25/00*    (2006.01)
*C01B 31/00*    (2006.01)
*C01B 33/00*    (2006.01)
*C01B 35/00*    (2006.01)

(52) U.S. Cl. .................. 423/239.1; 423/213.5; 502/304; 502/326; 502/328; 502/339; 502/439

(58) Field of Classification Search .................. 502/304, 502/326, 328, 339, 439; 423/213.5, 239.1
See application file for complete search history.

(56) References Cited

U.S. PATENT DOCUMENTS

| | | | | |
|---|---|---|---|---|
| 2,030,283 | A * | 2/1936 | De Rewal | 423/652 |
| 4,239,656 | A * | 12/1980 | Fujitani et al. | 502/200 |
| 4,274,981 | A * | 6/1981 | Suzuki et al. | 502/178 |
| 4,492,769 | A | 1/1985 | Blanchard et al. | |
| 4,760,044 | A * | 7/1988 | Joy et al. | 502/303 |

(Continued)

FOREIGN PATENT DOCUMENTS
EP    0387611 A    9/1990
(Continued)

OTHER PUBLICATIONS
Savva, P.G. et al. "The influence of reaction temperature on the chemical structure and surface concentration of active NOx in H2-SCR over Pt/MgO-CeO2: SSITKA-DRIFTS and transient mass spectrometry studies." (Journal of Catalysis), Jul. 25, 2008, 324-333, 257:2.

*Primary Examiner* — Cam N. Nguyen
(74) *Attorney, Agent, or Firm* — Millen, White, Zelano & Branigan, P.C.

(57) ABSTRACT

The invention relates to a novel catalyst having excellent activity and selectivity for reducing nitric oxides ($NO/NO_2$) to nitrogen gas ($N_2$) with hydrogen ($H_2$) being used as a reducing agent under strongly oxidizing conditions (e.g., 2-10 vol % $O_2$) ($H_2$-SCR) in the 100-400° C. range, but in particular to the low-temperature range 100-200° C. The inventive catalyst is a combination of platinum and palladium which are in contact with solid phases of a mixed MgO and $CeO_2$ medium.

20 Claims, 7 Drawing Sheets

U.S. PATENT DOCUMENTS

| | | | |
|---|---|---|---|
| 4,857,499 A * | 8/1989 | Ito et al. | 502/326 |
| 4,977,129 A * | 12/1990 | Ernest | 502/330 |
| 5,157,007 A * | 10/1992 | Domesle et al. | 502/66 |
| 5,559,275 A | 9/1996 | Barger | 568/905 |
| 5,677,258 A * | 10/1997 | Kurokawa et al. | 502/303 |
| 5,753,192 A * | 5/1998 | Dobson et al. | 422/177 |
| 5,789,339 A * | 8/1998 | Ziebarth et al. | 502/303 |
| 5,795,840 A * | 8/1998 | Takami et al. | 502/327 |
| 5,968,870 A * | 10/1999 | Iizuka et al. | 502/325 |
| 6,228,800 B1 * | 5/2001 | Yamaguchi et al. | 502/339 |
| 6,261,989 B1 * | 7/2001 | Tanaka et al. | 502/217 |
| 6,395,675 B1 * | 5/2002 | Suga et al. | 502/326 |
| 6,511,642 B1 * | 1/2003 | Hatanaka et al. | 423/239.1 |
| 6,514,905 B1 * | 2/2003 | Hanaki et al. | 502/328 |
| 6,602,802 B2 * | 8/2003 | Aoi | 438/778 |
| 6,620,392 B2 * | 9/2003 | Okamoto et al. | 423/213.5 |
| 6,764,665 B2 * | 7/2004 | Deeba et al. | 423/239.1 |
| 6,797,668 B2 * | 9/2004 | Yoshikawa | 502/304 |
| 6,858,193 B2 * | 2/2005 | Ruwisch et al. | 423/213.5 |
| 6,866,834 B2 * | 3/2005 | Nakamura et al. | 423/239.1 |
| 6,933,259 B2 * | 8/2005 | Hatanaka et al. | 502/240 |
| 7,030,055 B2 * | 4/2006 | Yaluris et al. | 502/326 |
| 7,105,137 B2 * | 9/2006 | Efstathiou et al. | 423/239.1 |
| 7,381,683 B1 * | 6/2008 | Wang et al. | 502/327 |
| 7,390,768 B2 * | 6/2008 | Jordan et al. | 502/326 |
| 7,759,278 B2 * | 7/2010 | Matsueda et al. | 502/302 |
| 7,795,172 B2 * | 9/2010 | Foong et al. | 502/327 |
| 2001/0036433 A1 * | 11/2001 | Euzen et al. | 423/245.3 |
| 2002/0090512 A1 * | 7/2002 | Hatanaka et al. | 428/402 |
| 2007/0093382 A1 | 4/2007 | Vanderspurt et al. | |
| 2009/0108238 A1 * | 4/2009 | Wagner et al. | 252/373 |
| 2009/0118119 A1 * | 5/2009 | Ratnasamy et al. | 502/303 |
| 2009/0280978 A1 * | 11/2009 | Nakamura et al. | 502/303 |

FOREIGN PATENT DOCUMENTS

| | | |
|---|---|---|
| EP | 1707262 A1 | 10/2006 |
| EP | 08018087.0 R | 4/2009 |
| JP | 56002848 A | 1/1981 |
| JP | 56002848 W | 1/1981 |
| WO | 03039740 A1 | 5/2003 |

* cited by examiner

CATALYST CONTAINING PLATINUM AND PALLADIUM FOR THE SELECTIVE REDUCTION OF NOX WITH HYDROGEN (H2-SCR)

FIELD OF THE TECHNIQUE

The present invention refers to a catalyst containing platinum and palladium on a support of magnesium oxide and cerium dioxide.

This catalyst can be used for the selective reduction of $NO_x$ by $H_2$. This catalyst can be used in the selective conversion of nitric oxide (NO) or nitric dioxide ($NO_2$) produced in many industrial combustion processes, to $N_2$ gas using $H_2$ as reducing agent. It is known that hydrogen is available in numerous industrial installations. Using the said catalyst, only a very small percentage of the available hydrogen is necessary for the reduction of $NO_x$ to $N_2$ under strongly oxidizing conditions ($H_2$-SCR) in the range 100-400° C.

The selective catalytic reduction of NO with $NH_3$ ($NH_3$-SCR) in the presence of an excess of oxygen is at presently considered the state-of-the-art $NO_x$ control catalytic technology for industrial stationary applications, and it has been reviewed [1]. In this process, ammonia is used to convert $NO_x$ into nitrogen and water reaction products with $N_2$ selectivities larger than 95% using vanadium pentoxide ($V_2O_5$) supported on oxides such as $TiO_2$, $Al_2O_3$ and $SiO_2$ and promoted with $WO_3$ and $MoO_3$ [2]. This catalyst is active in the temperature range 300-400° C. [3], whereas other catalyst formulations suitable at lower temperatures (~200° C.) have been commercialised [4]. Nevertheless, the toxicity, handling of ammonia, leaks of unconverted $NH_3$ to the environment, corrosion and fouling of equipment (formation of ammonium bisulphate), poisoning of the catalyst by $SO_2$, and high investment costs constitute main problems and concerns nowadays of the $NH_3$-SCR $NO_x$ control technology [1,5].

Selective catalytic reduction (SCR) of $NO_x$ from an industrial flue gas stream at low-temperatures (120-160° C.) has many advantageous over that at higher temperatures (e.g., T>250° C.). For example, placement of the catalyst after the electrostatic dust precipitator unit implies that the partially cleaned flue gas from dust requires less soot blowing and catalyst cleaning, thus providing longer catalyst lifetime. Furthermore, low-temperature SCR process can reduce both the investment and operating costs since the SCR unit can be located at the end of the stack gas train, thus minimising the need to run ductwork from a high-temperature region and then return the flue gas to the stack gas train. Also, less reheating of the flue gas from the de-$SO_x$ to the SCR unit is required [4,5]. New low-temperature SCR catalysts are also capable of retrofitting large utility boilers and installations firing natural gas or refinery fuel gas, and better heat economy of the whole flue gas after treatment process is achieved.

The selective catalytic reduction of NO with hydrocarbons (HC-SCR) has been extensively studied in recent years as a potential competitor of the $NH_3$-SCR process [1,6]. The main advantage of this catalytic reaction is the potential use of hydrocarbons as reducing species that can be found in the exhaust gases of combustion processes operating under strongly oxidizing conditions of $NO_x$. The catalysts that have attracted the attention of the HC-SCR process of NO can be divided into three main groups: (a) supported noble metals; (b) zeolites exchanged with metal ions; and (c) metal oxide catalysts [3]. Among these materials, supported noble metals have shown the best catalytic behaviour for the reduction of NO with hydrocarbons under oxidation conditions at reaction temperatures as low as 120-250° C. [7-15]. Also, it was found that these catalysts are more resistant to deactivation in the presence of water and/or $SO_2$ [16,17]. Nevertheless, in spite of their exceptional activity in this low-temperature region, supported Platinum and Palladium catalysts present low values of selectivity towards $N_2$ [1,18], and a relatively narrow range of operating temperatures. On the contrary, zeolites exchanged with metal ions are very active and selective for the SCR of NO with hydrocarbons at relatively low temperatures. However, these catalysts present an even narrower operating temperature range compared to that of supported noble metals. Also, the activity of zeolitic catalysts exchanged with metal ions drastically diminishes in the presence of water. Finally, catalysts based on metal oxides showed low activity but high selectivity towards $N_2$ for HC-SCR processes of NO but at temperatures above 500° C.

Current concerns regarding carbon dioxide emissions into the atmosphere and the problems resulting from the use of $NH_3$ as reducing agent [1,4,5,19] have encouraged a search for suitable molecules different from hydrocarbons for the selective catalytic reduction of NO in gaseous streams derived from combustion processes. It has been reported that hydrogen is a very effective reducing agent for the reaction $NO/H_2$ [20-30] and can potentially be used for reducing $NO_x$ emissions derived from stationary combustion sources. Hydrogen is currently used in industrial processes of petroleum refining, such as hydrotreatment and hydrocracking [31-33], the production of methanol [34,35], the conversion of methanol to gasoline [36,37], and the synthesis of ammonia [38,39] and hydrocarbons (Fischer-Tropsch process) [40-42]. Therefore, hydrogen is available in many industrial installations wherein various processes are operated requiring a heat input. Furthermore, the progressive demand for hydrogen with a growth rate of approximately 10% a year must be added [43], which means that the availability in the industrial sector will be increasing further in the coming years.

Therefore, a low-temperature $H_2$-SCR of $NO_x$ technology can be considered as breakthrough green and clean industrial $NO_x$ control technology compared to $NH_3$-SCR and HC-SCR technologies. For the latter process it should be noted that excess of hydrocarbon required ends up polluting the environment, which must be burned but it will produce more $CO_2$.

It is important to mention here that in the absence of oxygen in the supply stream, hydrogen cannot be regarded as a selective reducing agent due to the fact that other undesired products are usually formed, such as $N_2O$ and $NH_3$ in high selectivities. In the last years, a renewed interest in finding suitable catalyst compositions for industrial low-temperature $H_2$-SCR $NO_x$ control appeared [44-70]. In most of these publications, supported-Platinum catalysts with different support chemical composition and platinum loading were investigated. What is learned from these studies is that catalyst performance (NO conversion and $N_2$-selectivity) strongly depends on the combination of platinum metal loading and support chemical composition in a non-obvious way. Also, the temperature window of operation, $\Delta T_{50}$ (the temperature range for which the NO conversion is at least equal to 50% of the maximum conversion obtained) was found to depend strongly on the latter parameters [63,64].

Supported-palladium catalysts have also been investigated towards $H_2$-SCR [71-78] but to a significantly less extent than supported-Platinum catalysts, whereas low-temperature $NO_x$ control has been also studied with $H_2$/CO [79-82] and $H_2$/CO/$CH_4$ [83] reducing gas mixtures over supported-Palladium catalysts. It appears from these reports that $N_2$-selectivity of $H_2$-SCR might be lower or higher than that obtained over supported-Platinum catalysts at the same temperature in a non-obvious way, while NO conversion appears in general to be lower on supported-Palladium compared to supported-Platinum catalysts.

EP1475149 B1 discloses a catalyst for $NO_x$ control comprising platinum in an amount between 0.1 and 2.0 wt % dispersed on a pre-nitrated and pre-sulphated mixed metal oxide support of magnesium and cerium [70]. The latter supported platinum catalyst provides a high activity and $N_2$-selectivity at low reaction temperatures with a $N_2$-yield greater than 75%. Hydrogen is used as reducing agent at reaction temperatures between 100° C. and 200° C. The pre-nitration and pre-suphatation might be not necessary by using the catalyst with relatively clean gases with essentially no $SO_2$ content.

DESCRIPTION OF THE INVENTION

The object of the present invention is an alternative catalyst for the selective conversion of $NO_x$ to $N_2$.

This object is achieved by a catalyst comprising Platinum in an amount between 0.01 and 2.0 wt %, and Palladium in an amount between 0.01 and 2.0 wt %, and wherein both metals are dispersed on a mixed metal oxide support of Magnesium and Cerium.

The catalyst according to the invention exhibits a variety of advantages. The inventive catalyst has an excellent activity and $N_2$-selectivity for reducing nitric oxide using hydrogen as reducing agent in the low-temperature range 100-180° C. The activity and $N_2$-selectivity of the inventive catalyst are much better compared to the activity and selectivity of other catalysts according to prior art. The inventive catalyst with the combination of the two specific noble metals platinum and palladium and within the given amounts exhibits much better results towards $H_2$-SCR than a catalyst comprising only of one noble metal irrespective which noble metal is chosen.

Preferably platinum and palladium noble metals were dispersed on the mixed metal oxide support of Magnesium and Cerium with mean primary crystal size less than 15 nm. The mean primary crystal size in this embodiment of the invention is determined by X-ray diffraction and using the Scherrer relationship [84]. The catalyst Pt—Pd/MgO—$CeO_2$ that combines Pt and Pd catalytic phases with a specific structural feature of MgO and $CeO_2$ support, that of nano-crystallinity (<d> less than 15 nm), is the most active and selective reported to date in the patent and scientific open literature for the reaction $NO/H_2/O_2$ under strongly oxidizing conditions ($H_2$-SCR). The remarkably high values of NO conversion (>70%) and $N_2$-selectivity (>80%) observed in the whole 100-400° C. range make this particular catalytic composition unique for industrial $NO_x$ control exploitation. In the present practice of industrial $NO_x$ control, several catalysts are used to cover this wide temperature range of interest.

For the present inventive catalyst, the preferred metal content is 0.1 wt % Pt and 0.05 wt % Pd highly dispersed on the mixed oxide support of Mg and Ce by means of the wet-impregnation synthesis route. The order of deposition of the two noble metals (Pt and Pd) on the MgO—$CeO_2$ carrier, and the primary crystal size of MgO and $CeO_2$ improve the overall catalytic performance of the Pt—Pd/MgO—$CeO_2$ solid towards $H_2$-SCR of NO.

According to a particular embodiment, the catalyst consists of the mixed metal oxide 50 wt % MgO-50 wt % $CeO_2$.

According to an additional particular embodiment, the catalyst further contains more than one of the following compounds: Pt, Pt—Pd alloy, $PtO_x$, PdO, MgO, and $CeO_2$ which are all possibly formed in the catalyst Pt—Pd/MgO—$CeO_2$ under the conditions of preparation, calcination, and reaction (strongly oxidizing environment).

The present invention also refers to a process for obtaining a catalyst comprising platinum and palladium in an amount between 0.01 and 2.0 wt % for each noble metal, both metals dispersed on mixed metal oxide support of magnesium and cerium, comprising the steps:
- impregnating the mixed metal oxide of magnesium and cerium with an aqueous solution containing the desired quantity of platinum and palladium precursor,
- evaporation of water, drying, grinding and heating at 500° C. in air flow until complete conversion of the platinum and palladium precursors into their respective metal oxides, and
- reduction of the catalyst at 300° C. in $H_2$ flow for at least 1 hour.

Within the frame of the invention the term complete conversion covers a conversion of at least 90% of the precursors.

In a preferred embodiment of the invention, platinum and palladium, most preferred as nano-particles (<2 nm in size), were dispersed on magnesium oxide and cerium dioxide in a proportion 1:1 (w/w).

Advantageously magnesium oxide and cerium dioxide solids have primary crystal particles with mean diameters less than 15 nm.

In another embodiment of the invention the mixed metal oxide of magnesium and cerium is mixed with an aqueous solution containing the desired quantity of platinum or palladium precursor followed by the evaporation of water, drying, grinding and heating at 500° C. in air flow until complete conversion of the platinum or palladium precursors into the respective metal oxide, which is followed by the impregnation of the solid material with an aqueous solution containing the desired quantity of the second noble metal and the same evaporation, drying, grinding and heating procedure.

According to an additional particular embodiment, a surface compound of magnesium is formed by interaction between $NO_x$ (NO and $NO_2$) species present in the gaseous phase under reaction conditions and the oxide of magnesium present.

According to an additional particular embodiment, a surface compound of cerium is formed by interaction between $NO_x$ (NO and $NO_2$) species present in the gaseous phase under reaction conditions and the oxide of cerium present.

According to an additional particular embodiment, surface compounds of platinum and palladium are formed by interaction between species present in the gaseous phase under reaction conditions (NO, $NO_2$, $O_2$) and metallic platinum and palladium present.

The present invention also refers to the reduction of nitric oxide, nitrogen dioxide and/or mixture of nitric oxide and nitrogen dioxide to $N_2$ gas using hydrogen as reducing agent in the presence of the catalyst described herein.

The invented catalyst can be used in any kind of reactor employed industrially in such $H_2$-SCR processes, e.g., fixed-bed reactor, monolithic type reactor, etc., for the reduction of nitric oxide, nitrogen dioxide or mixture of nitric oxide and nitrogen dioxide to $N_2$ gas using hydrogen as reducing agent, and in the presence and/or absence of oxygen and/or water, and/or $CO_2$.

One embodiment of the invention also refers to a method of reducing a chemical compound selected from the group consisting of NO, $NO_2$ and/or a mixture of NO and $NO_2$ to $N_2$ gas using hydrogen as reducing agent in the presence of oxygen, and also in the presence of other gases, for example $H_2O$ and $CO_2$ by a catalyst comprising Pt in an amount between 0.01 and 2.0 wt % and Pd in an amount between 0.01 and 2.0 wt %, dispersed on a mixed metal oxide support of Mg and Ce having mean primary crystal sizes less or equal to 15 nm.

According to a particular embodiment in the mentioned method, a reactor selected from the group consisting of a fixed-bed reactor and a monolithic type reactor can be used.

The present invention provides a variety of advantages. First of all the $N_2$-yield of the inventive catalyst comprising platinum and palladium dispersed on a mixed metal oxide support of Magnesium and Cerium was much better than the $N_2$-yield of a catalyst comprising only one of the two noble metals.

In spite of the fact that catalysts based on noble metals are less prone to become deactivated in the presence of water and/or $SO_2$ [16,17], such catalysts have not been reported to be stable in the presence of water and/or $SO_2$ in the reaction $NO/H_2/O_2$ under $NO_x$ oxidation conditions. Nevertheless, the invented catalyst Pt—Pd/MgO—$CeO_2$ is expected to be very stable in the presence of water (5-15 vol %) or 20-50 ppmv $SO_2$ if the actual sulphation method is followed [68-70].

Additionally the catalyst according to the invention has a high selectivity for the reduction of $NO_x$ towards $N_2$ in the presence of oxygen. The conversion of $NO_x$ to $N_2$ with hydrogen as reducing agent in the presence of oxygen and a catalyst according to prior art leads normally to the unwanted side reaction of oxygen and hydrogen towards water. This unwanted side reaction is suppressed/not promoted by the catalyst according to the invention.

EXAMPLES OF EMBODIMENTS OF THE INVENTION

In the following the invention is described in more detail by examples of preferred embodiments of the invention. There can be no doubt that this detailed description is made by way of illustration only and does not limit the extent of the invention since there are many variations that can be made without detracting from the spirit of this invention.

Example 1

This example illustrates the synthesis of MgO and $CeO_2$ support phases with mean primary crystal sizes less than 15 nm (nano-crystalline material) using the solution combustion method [85-87] with urea as fuel. Magnesium ethoxide (Mg$(C_2H_5O)_2$, Aldrich 2414-98-4, 98%), magnesium acetylacetonate (Mg$(C_5H_8O_2)_2$.$2H_2O$, Aldrich 68488-07-3, 98%), magnesium acetate (Mg$(CH_3COO)_2$Mg.$4H_2O$, Aldrich 16674-78-5, 98%), and magnesium nitrate (Mg$(NO_3)_2$.$6H_2O$, Aldrich 13446-18-9, 98%) were used as precursor compounds of Mg. Cerium nitrate (Ce$(NO_3)_3$.$6H_2O$, Aldrich 10294-41-4, 99.99%), cerium acetylacetonate (Ce$(C_5H_8O_2)_3$.x$H_2O$, Aldrich 206996-61-4, 99%) and cerium acetate (Ce$(C_2H_3O)_3$.x$H_2O$, Aldrich 206996-60-3, 99.9%) were used as precursor compounds of Ce. A combination of each of the above mentioned precursor compounds from the Mg group with each of the precursor compounds from the Ce group was thoroughly mixed at room temperature in a ceramic mortar in the appropriate weight ratio corresponding to 1:1 (w/w) MgO:$CeO_2$ with a given amount of urea (Panreac Quimica SA, 99%). The resulting solid mixture was then placed in an oven and heated gradually in air to 200° C. The formation of a gel with foam-features was noticed. The temperature of the oven was kept at 200° C. until the cease of gas evolvement, where a solid in powder form was finally obtained. The temperature of the oven was then increased to 250° C. and kept at this temperature for 2 h. Finally, the solid residue was further heated to 500° C. and kept at this temperature for 2 h. It was then cooled to room temperature in air and stored for further use. The MgO:$CeO_2$:Urea ratio (w/w/w) was varied in the 1:1: x range, where x=2, 4, 6, 8, and 10. In some cases, the use of $H_2O$ or EtOH (200 mL) as solvents of Ce and Mg precursor compounds was made at the stage of their mixing at room temperature with urea.

According to Examples 4-7, the solution combustion method using urea without any use of EtOH or $H_2O$ provided the best catalytic performance towards $H_2$-SCR for the Pt—Pd/MgO—$CeO_2$ solids.

Example 2

Figure 1:
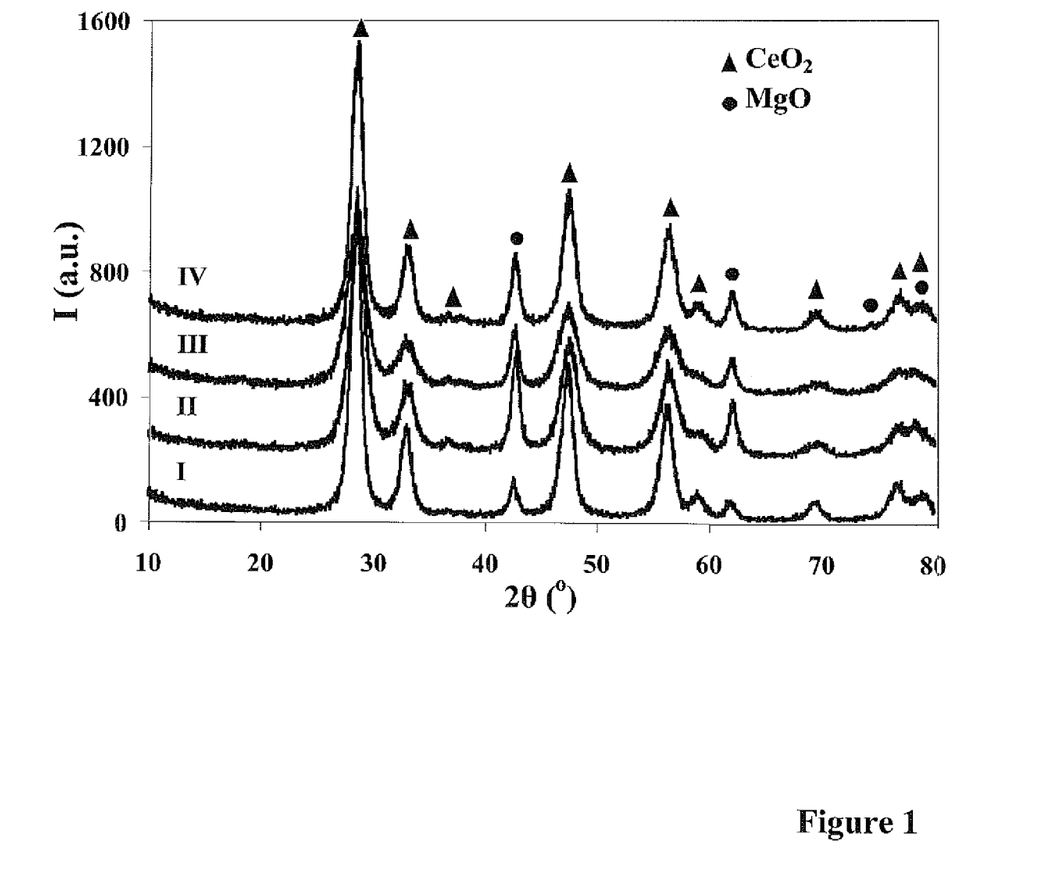

This example describes the characterisation results obtained for the MgO and $CeO_2$ mixed metal oxide support materials prepared by the solution combustion method (Example 1) and which indicate their primary nano-crystallite and secondary micro-crystallite dimensions. X-ray diffractograms (use of X-ray diffraction technique) of four samples of MgO—$CeO_2$ mixed metal oxide synthesized according to Example 1 are presented in FIG. 1. Based on these results and the use of the Scherrer relationship [84]:

$$<d>=K\lambda/(\beta \cdot \cos\theta)$$

where: $<d>$ is the mean primary crystal size, $\lambda$, is the X-rays wavelength used ($\lambda$=0.15418 nm), $\beta$ is the width of the XRD peak (MgO=43.07 2θ; $CeO_2$=47.82 2θ) at half maximum intensity, and K is a constant, which was taken equal to one [84], the mean primary crystal size ($<d>$, m) of MgO and $CeO_2$ was estimated. Mean primary crystal sizes in the 4.0-8.0 nm and 7.0-12 nm range, respectively, were synthesized in the case of MgO and $CeO_2$ metal oxides. The synthesis of both MgO and $CeO_2$ using organometallic than nitrate precursors of Mg and Ce, respectively (Example 1) led to smaller mean primary crystal sizes.

The mean particle size of the secondary MgO and $CeO_2$ crystal particles and their morphology were determined by Scanning Electron Microscopy (SEM). In the case of synthesized MgO—$CeO_2$ material with a weight ratio MgO:$CeO_2$:Urea=1:1:6, and without using any solvent (Example 1), secondary crystals in the 0.1-3 μm range were obtained. By increasing the MgO:$CeO_2$:Urea weight ratio to 1:1:8, a wider distribution of secondary crystal particles were obtained (0.1-7 μm). As a general conclusion, the secondary particle size of MgO and $CeO_2$ metal oxides and their morphology were strongly dependent on the concentration of urea used during synthesis (Example 1). The specific surface area (BET, m²/g) was always larger than 30 m²/g for any MgO—$CeO_2$ mixed metal oxide synthesized according to the procedure described in Example 1.

Example 3

Pt/MgO—$CeO_2$, Pd/MgO—$CeO_2$ and Pt—Pd/MgO—$CeO_2$ catalysts were prepared by means of the wet impregnation method as follows:

Pt/MgO—$CeO_2$ and Pd/MgO—$CeO_2$ Catalysts 0.5 g of MgO—$CeO_2$ prepared by the solution combustion method (Example 1) or a mechanical mixture of 0.25 g of commercial nano-crystalline MgO (Aldrich 1309-48-4, mean primary crystal size 9.0 nm) and 0.25 g of commercial nano-crystalline $CeO_2$ (Aldrich 1306-38-3, mean primary crystal size 5 nm) were impregnated with 200 ml of an aqueous solution containing the desired quantity of hexachloroplatinic acid (Aldrich, 26, 258-7) or Pd$(NO_3)_2$ solution (Aldrich 380040). The excess of water was evaporated with continuous stiffing at 80° C. and the residue was dried at 120° C. for 8 h. The dry residue was sieved and heated at 500° C. in a flow of air for at least 2 h in order to remove chlorine from the catalyst surface and convert Pt into $PtO_2$ (the case of Pt/MgO—$CeO_2$ catalyst) or nitrates from the catalyst surface and convert Pd into PdO (the case of Pd/MgO—$CeO_2$ catalyst). The catalyst sample was then reduced in a flow of $H_2$ at 300° C. for at least 2 h. The content of metallic platinum varied in the 0.01-2.0 wt % range, whereas that of Pd in the 0.01-2.0 wt % range.

Pt—Pd/MgO—$CeO_2$ Catalyst 0.5 g of MgO—$CeO_2$ prepared by the solution combustion method (Example 1) or a mechanical mixture of 0.25 g of commercial nano-crystalline MgO (Aldrich 1309-48-4, primary crystal size 9.0 nm) and 0.25 g of nano-crystalline $CeO_2$ (Aldrich 1306-38-3, mean primary crystal size 5 nm) were impregnated with 200 ml of an aqueous solution containing the desired quantity of both hexachloroplatinic acid (Aldrich, 26, 258-7) and palladium nitrate solution (Aldrich 380040) coded here as "one-step wet impregnation" process. The excess of water was evaporated with continuous stirring at 80° C. and the residue was dried at 120° C. for 8 h. The dry residue was sieved and heated at 500° C. in a flow of air for at least 2 h in order to remove chlorine and nitrates from the solid surface and convert Pt and Pd into their respective metal oxides. The catalyst was then reduced in a flow of $H_2$ at 300° C. for at least 2 h. The content of metallic platinum (Pt) and palladium (Pd) was varied in the 0.01-2.0 wt % and 0.01-2.0 wt % range, respectively.

Alternatively, impregnation of the MgO—$CeO_2$ solid was performed using first either the desired amount of hexachloroplatinic acid or that of palladium nitrate precursor solution. The excess of water was evaporated with continuous stirring at 80° C. and the residue was dried at 120° C. for 8 h. The dry residue was sieved and heated at 500° C. in a flow of air for at least 2 h in order to remove chlorine or nitrates from the solid surface and convert Pt or Pd into their respective metal oxide. Following this step, the solid material was again impregnated with the solution of the second noble metal (either Pd or Pt) following exactly the same procedure as for the first noble metal. This process of deposition of the two noble metals (Pt and Pd) is coded "two-step wet impregnation". The excess of water was evaporated with continuous stirring at 80° C. and the residue was dried at 120° C. for 8 h. The dry residue was sieved and heated at 500° C. in a flow of air for at least 2 h in order to remove nitrates or chlorine from the solid surface and convert Pd or Pt into their respective metal oxide. The catalyst was then reduced in a flow of $H_2$ at 300° C. for at least 2 h. The content of metallic platinum (Pt) and palladium (Pd) was varied in the 0.01-2.0 wt % and 0.01-2.0 wt % range, respectively.

The dispersion of platinum and palladium in the Pt/MgO—$CeO_2$ and Pd/MgO—$CeO_2$ catalysts, respectively, was measured by means of $H_2$ chemisorption at 25° C. followed by thermal programmed desorption (TPD) in He flow [88]. Prior to the $H_2$ TPD, the sample was purged in He for 45 min at room temperature. Dispersions of platinum larger than 75% for the 0.01-0.3 wt % Pt/MgO—$CeO_2$ and of palladium larger than 75% for the 0.01-0.3 wt % Pd/MgO—$CeO_2$ catalysts were determined, whereas lower dispersions were measured at higher Pt and Pd loadings.

Example 4

This example of an embodiment of the invention combines the two noble metals with the primary nano-crystals of MgO and $CeO_2$.

Figure 2:
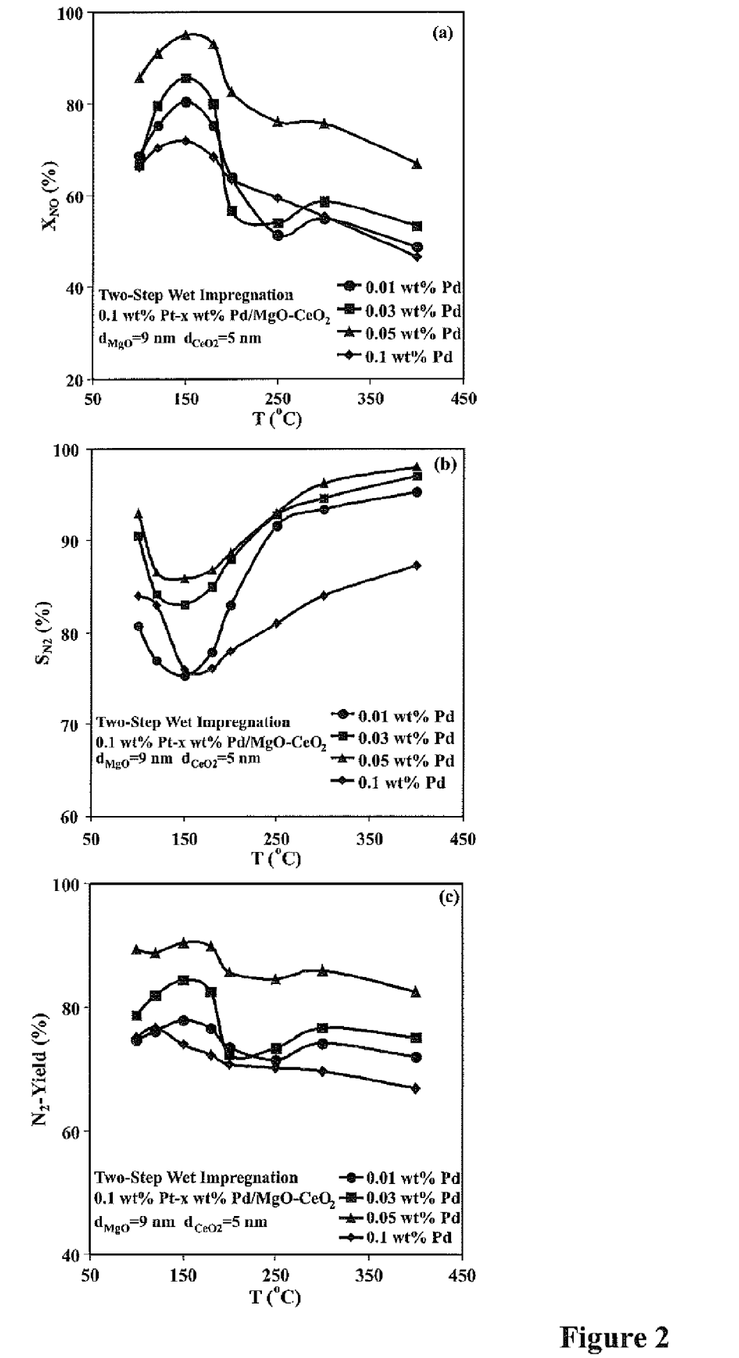
FIG. 2 presents the effect of Pd loading (x wt %) in the 0.01-0.1 wt % range on the catalytic performance: (a) NO conversion, $X_{NO}$(%); (b) $N_2$-selectivity, $S_{N2}$(%), and (c) $N_2$-yield, $Y_{N2}$(%) towards $H_2$-SCR in the temperature range 100-400° C. of 0.1 wt % Pt-x wt % Pd/MgO—$CeO_2$ the support of which consists of MgO and $CeO_2$ of small mean primary crystal size ($d_{MgO}$=9.0 nm; $d_{CeO2}$=5 nm). The deposition of Pt and Pd metals was made via the "two-step wet impregnation" method (see Example 3). Reaction conditions: $H_2$=1.0 vol %, NO=1000 ppm, $O_2$=5 vol %, He as balance gas; W=0.15 g, GHSV=80,000 $h^{-1}$, $P_{tot}$=1.0 bar.

FIG. 2 illustrates the effect of Pd loading (wt %) on the catalytic performance of 0.1 wt % Pt-x wt % Pd/MgO—$CeO_2$ catalysts prepared according to the "two-step wet impregnation" method described in Example 3 (Pt was first deposited followed by Pd). 150 mg of 0.1 wt % Pt-x wt % Pd/MgO—$CeO_2$ catalyst were placed in a fixed-bed quartz micro-reactor, and a flow of 1000 ppm NO, 1 vol % $H_2$, 5 vol % $O_2$ and 93.9 vol % He gas mixture resulting in a GHSV of approximately 80,000 $h^{-1}$ was used. The support material comprised MgO and $CeO_2$ with mean primary crystal sizes of 9 nm and 5 nm, respectively. As clearly illustrated in FIG. 2, there is an optimum Pd loading for the NO conversion (FIG. 2a) and $N_2$-yield (FIG. 2c), that of 0.05 wt % Pd. The effect of Pd in combination with the effect of primary crystal size of MgO—$CeO_2$ support material resulted in an exceptional catalytic behaviour, never reported before in the open scientific and patent literature for the $H_2$-SCR conditions reported in this Example. $N_2$-yields in the 82-90% range were obtained in the very wide temperature range of 100-400° C. This result has a significant practical application since the same catalyst composition can be used to cover industrial $NO_x$ control applications at different temperatures. This behaviour is likely to be due to the creation of a number of different in structure active adsorbed $NO_x$ species on the periphery of Pt and Pd nano-particles with the MgO and $CeO_2$ nano-crystals, as evidenced in the case of Pt/MgO—$CeO_2$ catalyst [88,89]. Also, the likely formation of Pt—Pd alloy nano-particles might enhance surface hydrogen diffusion from the noble metal surface to the metal-support interface, the latter step proved to be an important step in the mechanism of $H_2$-SCR in a similar catalyst [88,89] to the present Pt—Pd/MgO—$CeO_2$.

Pd loadings larger than 0.1 wt % up to 2.0 wt % did not result in better catalytic performance in terms of $N_2$-yield to that obtained with 0.05 wt % Pd.

Example 5

Figure 3:
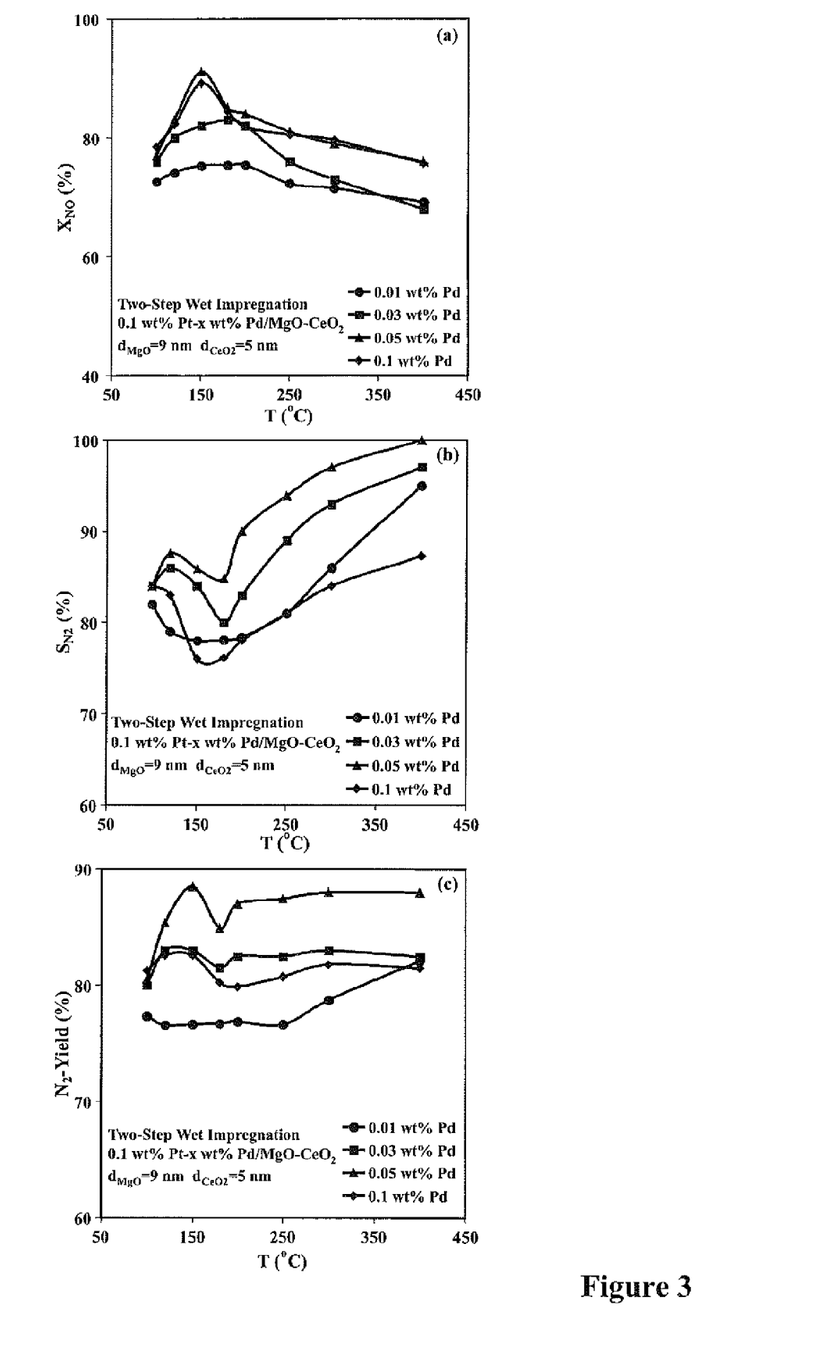
FIG. 3 presents the effect of Pd loading (x wt %) in the 0.01-0.1 wt % range on the catalytic performance: (a) NO conversion, $X_{NO}$(%); (b) $N_2$-selectivity, $S_{N2}$(%), and (c) $N_2$-yield, $Y_{N2}$(%) towards $H_2$-SCR in the temperature range 100-400° C. of 0.1 wt % Pt-x wt % Pd/MgO—$CeO_2$ catalyst the support of which consists of MgO and $CeO_2$ of small mean primary crystal size ($d_{MgO}$=9.0 nm; $d_{CeO2}$=5 nm). The deposition of Pt and Pd metals was made via the two-step wet impregnation method (see Example 3). Reaction conditions: $H_2$=1.0 vol %, NO=100 ppm, $O_2$=5 vol %, He as balance gas; W=0.15 g, GHSV=80,000 $h^{-1}$, $P_{tot}$=1.0 bar.

This example presents results of the effect of Pd loading (wt %) on the catalytic performance of 0.1 wt % Pt-x wt % Pd/MgO—$CeO_2$ solid for the same experimental conditions described in Example 4 but with different feed gas composition. The latter consisted of 100 ppm NO, 1 vol % $H_2$, 5 vol % $O_2$ and 93.99 vol % He. Again, as illustrated in FIG. 3 the optimum Pd loading appears to be that of 0.05 wt % for the whole 100-400° C. temperature range.

Pd loadings larger than 0.1 wt % up to 2.0 wt % did not result in better catalytic performance in terms of $N_2$-yield to that obtained with 0.05 wt % Pd.

Example 6

Figure 4:
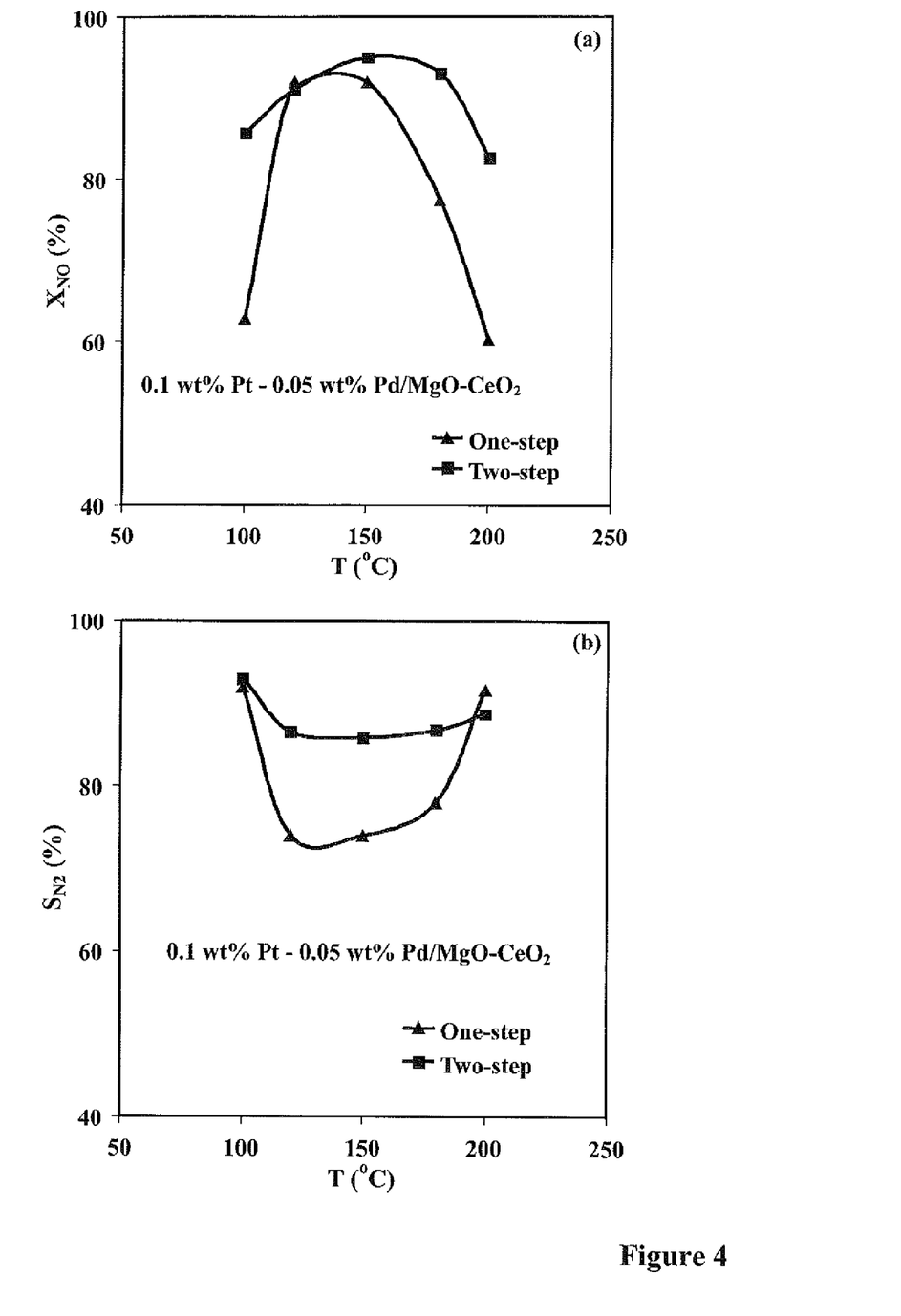
FIG. 4 compares the effect of the synthesis method of 0.1 wt % Pt-0.05 wt % Pd/MgO—$CeO_2$ solid on its catalytic performance: (a) NO conversion, $X_{NO}$(%), and (b) $N_2$-selectivity, $S_{N2}$(%) towards $H_2$-SCR in the low-temperature range 100-200° C. The support consists of MgO and $CeO_2$ of small mean primary crystal size ($d_{MgO}$=9.0 nm; $d_{CeO2}$=5 nm). Deposition of Pt and Pd metals was made via the one-step or two-step wet impregnation method (see Example 3). Reaction conditions: $H_2$=1.0 vol %, NO=1000 ppm, $O_2$=5 vol %, He as balance gas; W=0.15 g, GHSV=80,000 $h^{-1}$, $P_{tot}$=1.0 bar.
Figure 5:
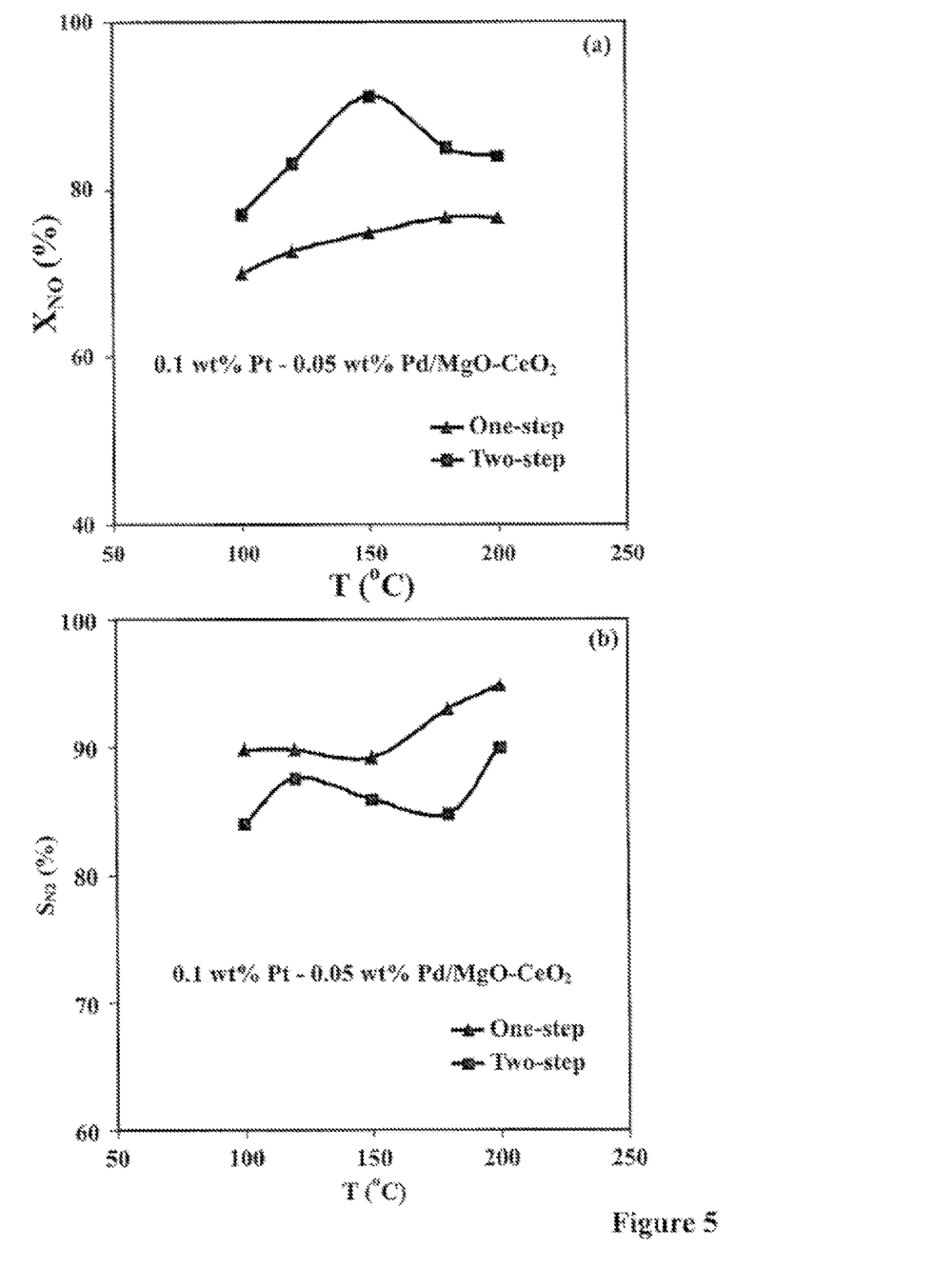
FIG. 5 compares the effect of the synthesis method of 0.1 wt % Pt-0.05 wt % Pd/MgO—$CeO_2$ solid on its catalytic performance: (a) NO conversion, $X_{NO}$(%), and (b) $N_2$-selectivity, $S_{N2}$(%) towards $H_2$-SCR in the low-temperature range 100-200° C. The support consists of MgO and $CeO_2$ of small mean primary crystal size ($d_{MgO}$=9.0 nm; $d_{CeO2}$=5 nm). Deposition of Pt and Pd metals was made via the one-step (▲) or two-step (■) wet impregnation method (see Example 3). Reaction conditions: $H_2$=1.0 vol %, NO=100 ppm, $O_2$=5 vol %, He as balance gas; W=0.15 g, GHSV=80,000 $h^{-1}$, $P_{tot}$=1.0 bar.

This example illustrates the significance of another embodiment of the present invention, namely the sequence of wet impregnation of the MgO—$CeO_2$ support with the solution of Pt and Pd precursor compounds used to prepare the Pt—Pd/MgO—$CeO_2$ catalyst. As depicted in FIGS. 4 and 5, the one-step versus the two-step wet impregnation by which Pt and Pd metals were deposited on the MgO—$CeO_2$ support material (Example 3) had a significant influence on the catalytic performance towards $H_2$-SCR in the case of using either 1000 ppm NO (FIG. 4) or 100 ppm NO (FIG. 5) in the feed stream that contained also 1 vol % $H_2$, 5 vol % $O_2$, and He as balance gas. The support material comprised MgO and $CeO_2$ with mean primary crystal sizes of 9 nm and 5 nm, respectively. According to the results of FIGS. 4 and 5, the magnitude of the effect of one-step versus two-step wet impregnation on the NO conversion and $N_2$-selectivity depends on the reaction temperature and feed gas composition used. In the case of use of 100 ppm NO in the feed stream (FIG. 5), even though $N_2$-selectivities are lower for the two-step wet impregnation method, the $N_2$-yields are larger than those obtained with the one-step synthesis method. For example, at 180° C. the increase of NO conversion (FIG. 4a) was 16 percentage units and that of $N_2$-selectivity (FIG. 4b) was 10 percentage units when using the two-step compared to the one-step wet impregnation for Pt and Pd deposition.

It was found that the "two-step wet impregnation" method provided the best overall catalytic performance in terms of $N_2$-yield (%) for all Pt and Pd loadings used (0.01-2.0 wt %).

Example 7

Figure 6:
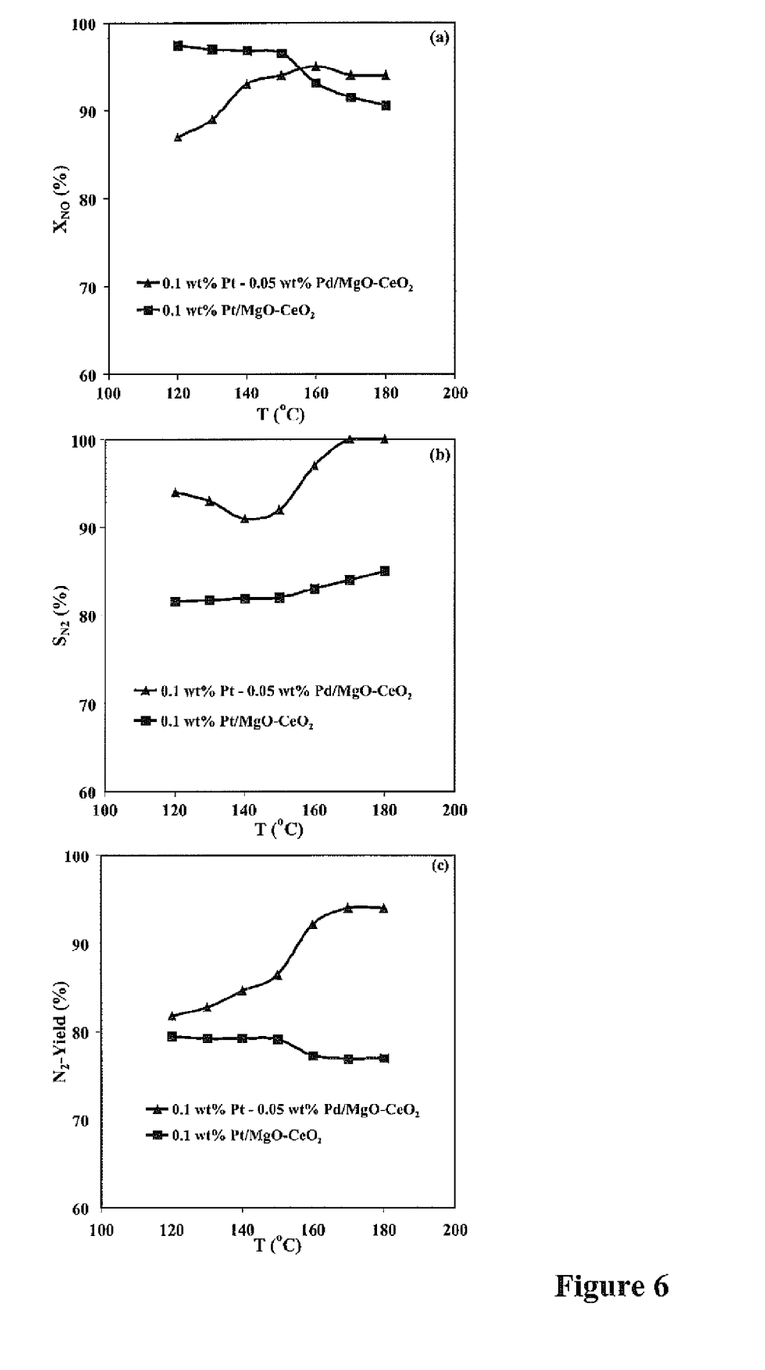
FIG. 6 shows the influence of Pd on the catalytic performance: (a) NO conversion, $X_{NO}$(%); (b) $N_2$-selectivity, $S_{N2}$(%), and (c) $N_2$-yield, $Y_{N2}$(%) towards $H_2$-SCR in the low-temperature range 120-180° C. of 0.1 wt % Pt-0.05 wt % Pd/MgO—$CeO_2$ (▲) compared to 0.1 wt % Pt/MgO—$CeO_2$ (■) solid, where the support of both catalysts has the same mean primary crystal size ($d_{MgO}$=4.7 nm; $d_{CeO2}$=11.1 nm). Reaction conditions: $H_2$=0.7% vol, NO=500 ppm, $O_2$=3 vol %, He balance gas; W=0.3 g; GHSV=40.000 $h^{-1}$. $P_{tot}$=1.0 bar.
Figure 7:
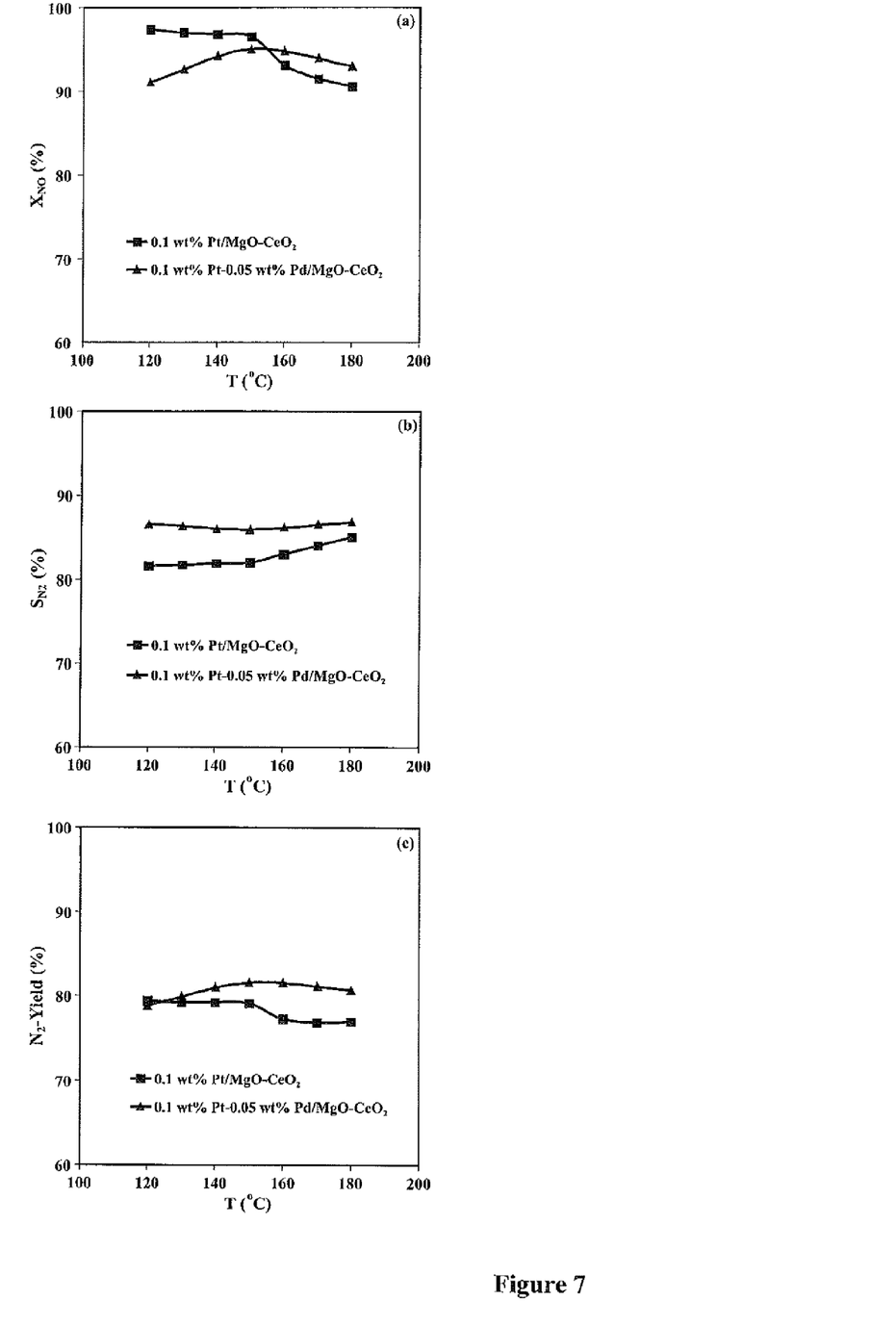
FIG. 7 shows the influence of Pd on the catalytic performance: (a) NO conversion, $X_{NO}$(%); (b) $N_2$-selectivity, $S_{N2}$(%), and (c) $N_2$-yield, $Y_{N2}$(%) towards $H_2$-SCR in the low-temperature range 120-180° C. of 0.1 wt % Pt-0.05 wt % Pd/MgO—$CeO_2$ (▲) compared to 0.1 wt % Pt/MgO—$CeO_2$ (■) solid, where the support of both catalysts has the same mean primary crystal size ($d_{MgO}$=4.7 nm; $d_{CeO2}$=11.1 nm). Reaction conditions: $H_2$=1.0% vol, NO=100 ppm, $O_2$=5 vol %, He balance gas; W=0.15 g; GHSV=80.000 $h^{-1}$. $P_{tot}$=1.0 bar.

This example illustrates the remarkable performance of the 0.1 wt % Pt-0.05 wt % Pd/MgO—$CeO_2$ catalyst the support of which comprises of primary nano-crystals of MgO (4.7 nm) and $CeO_2$ (11.1 nm) prepared according to what referred in Example 3, towards $H_2$-SCR in the low-temperature range of 120-180° C. that finds particular advantages for industrial $NO_x$ control as outlined in section "Field of the Technique". FIGS. 6 and 7 compare the catalytic performance ($X_{NO}$(%), $S_{N2}$(%), and $Y_{N2}$(%)) of the 0.1 wt % Pt-0.05 wt % Pd/MgO—$CeO_2$ solid with that of 0.1 wt % Pt/MgO—$CeO_2$ solid the support of which comprised of large primary crystals of MgO (44 nm) and $CeO_2$ (41 nm) for two different feed gas compositions: 500 ppm NO/0.7 vol % $H_2$/3 vol % $O_2$/He at a GHSV of about 40.000 $h^{-1}$ (FIG. 6), and 100 ppm NO/1 vol % $H_2$/5 vol % $O_2$/He at a GHSV of about 80.000 $h^{-1}$. This comparison again points out the non-obvious inventive step of combining the beneficial effect of MgO and $CeO_2$ support primary crystal size with that of the presence of another catalytic component besides Pt, that of Pd.

A remarkable behaviour of the $N_2$-selectivity ($S_{N2}$=92-100%) and NO conversion (87-95%) are obtained in the whole temperature range of 120-180° C. for the feed mixture of 500 ppm NO/0.7 vol % $H_2$/3 vol % $O_2$/He (FIGS. 6a, b), resulting in $N_2$-yields in the range 82-94% (FIG. 6c). This result is the best ever reported for low-temperature (T<200° C.) $H_2$-SCR for similar feed gas composition and GHSV used. It is very important to mention also here that such high $N_2$-yields make $H_2$-SCR strong competitor of low-temperature $NH_3$-SCR given the advantages of $H_2$-SCR previously described. As the concentration of $O_2$ in the feed stream increases from 3 vol % to 5 vol %, the beneficial effect of Pd and primary crystal size becomes smaller but not insignificant (compare FIGS. 6 and 7).

BRIEF DESCRIPTION OF THE FIGURES

FIG. 1 presents X-ray diffractograms for MgO—$CeO_2$ mixed metal oxides synthesized according to the procedure described in Example 1. The diffractograms I-IV correspond to four different combinations of Mg and Ce organometallic precursor compounds used: (I) magnesium acetate/cerium acetylacetonate; (II) magnesium acetylacetonate/cerium acetylacetonate; (III) magnesium acetylacetonate/cerium acetate; (IV) magnesium ethoxide/cerium acetate. X-ray diffractograms were taken after calcination in air at 500° C. for 2 h of the solid prepared according to Example 1. The weight ratio of MgO:$CeO_2$:Urea used was 1:1:6.

The preceding examples can be repeated with similar success by substituting the generically or specifically described reactants and/or operating conditions of this invention for those used in the preceding examples.

In the foregoing and in the examples and, all parts and percentages are by weight, unless otherwise indicated.

The entire disclosures of all applications, patents and publications, cited herein and of corresponding EP application No. 08018087.0, filed Oct. 15, 2008. are incorporated by reference herein.

CITED BIBLIOGRAPHY

1. G. Ertl, H. Knözinger, J. Weitkamp, in Handbook of Heterogeneous Catalysis, VCH, Weinheim, Germany, 1997, p. 1633; F. Nakajima, I. Hamada, Catal. Today 29 (1996) 109; G. Busca, L. Lietti, G. Ramis, F. Bern, Appl. Catal. B: Environ. 18 (1998) 1; V. I. Parvulescu, P. Grange, B. Delmon, Catal. Today 46 (1998) 233.
2. C. J. Pereria, K. W. Phumlee, Catal. Today 13 (1992) 23.
3. A. Fritz, V. Pitchon, Appl. Catal. B: Environ. 13 (1997) 1.
4. L. Singoredjo, R. Korver, F. Kapteijn, J. Moulijn, Appl. Catal. B: Environ. 1 (1992) 297.
5. H. Gutberlet, B. Schallert, Catal. Today 16 (1993) 207.
6. M. Iwamoto, H. Yahiro, Catal. Today 22 (1994) 5.
7. A. Obuchi, A. Ohi, M. Nakamura, A. Ogata, K. Mizuno, H. Ohuchi, Appl. Catal. B: Environ. 2 (1993) 71.
8. R. Burch, P. J. Millington, A. P. Walker, Appl. Catal. B: Environ. 4 (1995) 65.
9. D. K. Captain, K. L. Roberts, M. D. Amiridis, Catal. Today 42 (1998) 65.
10. R. Burch, J. A. Sullivan, T. C. Watling, Catal. Today 42 (1998) 13.
11. R. Burch, A. Ramli, Appl. Catal. B: Environ. 15 (1998) 63.
12. M. D. Amiridis, K. L. Roberts, C. J. Perreria, Appl. Catal. B: Environ. 14 (1997) 203.
13. G. R. Bamwenda, A. Ogata, A. Obuchi, J. Oi, K. Mizuno, J. Skrzypek, Appl. Catal. B: Environ. 6 (1995) 311.
14. E. A. Efthimiades, S. C. Christoforou, A. A. Nikolopoulos, I. A. Vasalos, Appl. Catal. B: Environ. 22 (1999) 91.
15. E. Seker, J. Cavatio, E. Gulari, P. Lorpongpaiboon, S. Osuwan, Appl. Catal. A 183 (1999) 121.
16. H. Hirabayashi, H. Yahiro, N. Mizuno, M. Iwamoto, Chem. Lett. (1992) 2235.
17. G. Zhang, T. Yamaguchi, H. Kawakami, T. Suzuki, Appl. Catal. B: Environ. 1 (1992) L1519.
18. A. Obuchi, A. Ohi, M. Nakamura, A, Ogata, K. Mizuno, H. Ohuchi, Appl. Catal. B: Environ. 2 (1993) 71.
19. B. Rausenberger, W. Swiech, A. K. Schmid, C. S. Rastomjee, W. Emgel, A. M. Bradshaw, J. Chem. Soc., Faraday Trans. 94(7) (1998) 963.
20. R. Dumpelmannm, N. W. Cant, D. L. Trimm in A. Frennet and J.-M. Bastin (Eds.) $3^{rd}$ ICC and Automotive Pollution Control, Brussels, 2 (1994) 13.
21. K. Tomishige, K. Asakura, U. Iwasawa, J. Catal. 157 (1995) 472.
22. W. C. Hecker, A. T. Bell, J. Catal. 92 (1985) 247.
23. A. Hornung, M. Muhler, G. Ertl, Catal. Lett. 53 (1998) 77.
24. T. P. Kobylinski, B. W. Taylor, J. Catal. 33 (1974) 376.
25. S. J. Huang, A. B. Walters, M. A. Vannice, J. Catal. 173 (1998) 229.
26. R. Burch, S. Squire, Catal. Lett. 27 (1994) 177.
27. T. M. Salama, R. Ohnishi, T. Shido, M. Ichikawa, J. Catal. 162 (1996) 169.
28. K. Tanaka, H. Yokota, M. Doi, M. Sugiura, Chem. Lett. (1997) 273.
29. A. Lindsteld, D. Stromberg, M. A. Milh, Appl. Catal. 116 (1994) 109.
30. D. Ferri, L. Formi, M. A. P. Dekkers, B. E. Nieuwenhuys, Appl. Catal. B: Environ. 16 (1998) 339.
31. J. R. Rostrup-Nielsen, Catal. Today 18 (1993) 305.
32. I. Alstrup, J. Catal. 109 (1998) 241.
33. S. T. Ceyer, Q. Y. Yang, M. B. Lee, J. D. Beckerle, A. D. Johnson, Stud. Surf. Sci. Catal. 36 (1987) 51.
34. I. Alstrup, M. T. Travers, J. Catal. 135 (1992) 147.
35. T. B. Beebe, Jr., D. W. Goddman, B. D. Kay, T. J. Yates, Jr., J. Chem. Phys. 87 (1987) 2305.
36. I. Alstrup, I. Chorkendorff, S. Ullmann, Surf. Sci. 234 (1990) 79.
37. H. J. Topfer, Gas Wasserfach 117 (1976) 412.
38. S. Tenner, Hydrocarbon Processing 66(7) (1987) 42.
39. A. T. Ashcroft, A. K. Cheetham, M. L. H. Green, P. D. F. Vernon, Nature 352 (1991) 225.
40. J. T. Richardson, S. A. Paripatyadar, Appl. Catal. 61 (1990) 293.
41. I. M. Bodrov, L. O. Apel'baum, Kinet. Katal. 8 (1967) 379.
42. I. M. Bodrov, L. O. Apel'baum, Kinet. Katal. 5 (1964) 696.
43. M. A. Peña, J. P. Gomez, J. L. G. Fierro, Appl. Catal. A: Chem. 144 (1996) 7.
44. B. Frank, G. Emig, A. Renken, Appl. Catal. B: Environ. 19 (1998) 45.
45. R. Burch, M. D. Coleman, Appl. Catal. B. Environ. 23 (1999) 115.
46. A. Ueda, T. Nakao, M. Azuma, T. Kobayashi, Catal. Today 45 (1998) 135.
47. K. Yokota, M. Fukui, T. Tanaka, Appl. Surf. Sci 121/122 (1997) 273.
48. M. Machida, S. Ikeda, D. Kurogi, T. Kijima, Appl. Catal. B: Environ. 35 (2001) 107.
49. R. Burch, P. J. Millington, A. P. Walker Appl. Catal B. Environ. 4 (1994) 160.
50. M. Fukui, K. Yokata, Shokubai, Catal. Catal. 36 (1994) 160.
51. J. Shibata, M. Hashimoto, K. Shimizu, H. Yoshida, T. Hattori, A. Satsuma, J. Phys. Chem. B 108 (2004) 18327.
52. L. Fu, K. T. Chuang, Energy Fuels 3 (1989) 740.
53. M. Machida, T. Watanabe, Appl. Catal. B: Environ. 52 (2004) 281.
54. T. Nanba, C. Kohno, S. Masukawa, J. Uchisawa, N. Nakayama, A. Obuchi, Appl. Catal. B: Environ. 46 (2003) 353.
55. M. Machida, Catal. Surveys Japan 5 (2002) 91.
56. T. Nanba, K. Sugawara, S. Masukawa, J. Uchisawa, A. Obuchi, Top. Catal. 42/43 (2007) 129.
57. S. Hamada, S. Hibarino, K. Ikeue, M. Machida, Appl. Catal. B: Environ. 74 (2007) 197.
58. S. Hamada, K. Ikeue, M. Machida, Appl. Catal. B: Environ. 71 (2007) 1.
59. Y. Hasegawa, M. Haneda, Y. Kintaichi, H. Hamada, Appl. Catal. B: Environ. 60 (2005) 41.
60. M. Engelmann-Pirez, P. Granger, G. Leclercq, Catal. Today 107/108 (2005) 315.
61. M. Machida, T. Watanabe, Appl. Catal. B: Environ. 52 (2004) 281.
62. J. Shibata, M. Hashimoto, K. Shimizu, H. Yoshida, T. Hattori, A. Satsuma, J. Phys. Chem. B 108 (2004) 18327.
63. C. N. Costa, V. N. Stathopoulos, V. C. Belessi, A. M. Efstathiou, J. Catal. 197 (2001) 350.
64. C. N. Costa, P. G. Savva, C. Andronikou, G. Lambrou, K. Polychronopoulou, V. N. Stathopoulos, V. C. Belessi, P. J. Pomonis, A. M. Efstathiou, J. Catal. 209 (2002) 456.

65. C. N. Costa, A. M. Efstathiou, Environ. Chem. Lett. 2 (2004) 55.
66. C. N. Costa, A. M. Efstathiou, J. Phys. Chem. B 108 (2004) 2620.
67. C. N. Costa, A. M. Efstathiou, Appl. Catal. B: Environ. 72 (2007) 240.
68. C. N. Costa, P. G. Savva, J. L. G. Fierro, A. M. Efstathiou, Appl. Catal. B: Environ. 75 (2007) 147.
69. A. M. Efstathiou, C. N. Costa, J. L. G. Fierro, "Novel Catalyst for the Reduction of NO to $N_2$ with Hydrogen under $NO_x$ Oxidation Conditions, Spanish Patent ES 2 192 985 B1 (2005); U.S. Pat. No. 7,105,137 B2 (2006).
70. A. M. Efstathiou, C. N. Costa, J. L. G. Fierro, "Catalyst Containing Platinum on a Support Consisting of Magnesium Oxide and Cerium Oxide for the Reduction of NO to $N_2$ with Hydrogen Under $NO_x$ Oxidation Conditions", Eur. Patent No. 1 475 149 B1 (2008).
71. K. Yokota, M. Fukui, T. Tanaka, Appl. Surf. Sci. 121/122 (1997) 273.
72. R. Burch, M. D. Coleman, Appl. Catal. B: Environ. 23 (1999) 115.
73. M. Machida, D. Kurogi, T. Kijima, Chem. Mater. 12 (2000) 3165.
74. M. Machida, D. Kurogi, T. Kijima, J. Phys. Chem. B 107 (2003) 196.
75. G. Qi, R. T. Yang, F. C. Rinaldi, J. Catal. 237 (2006) 381.
76.1. Twagirashema, M. Engelmann-Pirez, M. Frere, L. Burylo, L. Gengembre, C. Dujardin, P. Granger, Catal. Today 119 (2007) 100.
77.1. Twagirashema, M. Frere, L. Gengembre, C. Dujardin, P. Granger, Top. Catal. 42/43 (2007) 171.
78. F. Dhainaut, S. Pietrzyk, P. Granger, Top. Catal. 42/43 (2007) 135.
79. N. Macleod, R. M. Lambert, Catal. Commun 3 (2002) 61.
80. Y.-W. Lee, E. Gulari, Catal. Commun 5 (2004) 499.
81. N. Macleod, R. Cropley, J. M. Keel, R. M. Lambert, J. Catal. 221 (2004) 20.
82. M. Konsolakis, M. Vrontaki, G. Avgouropoulos, T. Ioannides, I. V. Yentekakis, Appl. Catal. B: Environ. 68 (2006) 59.
83. J. A. Z. Pieterse, S. Booneveld, Appl. Catal. B: Environ. 73 (2007) 327.
84. A. L. Patterson, Phys. Rev. 56 (1939) 978.
85. C.-C. Hwang, T.-H. Hwang, J.-S. Tsai, C.-S. Lin, C. H. Peng, Mat. Sci. Eng. B 132 (2006) 229.
86. K. C. Patil, S. T. Aruna, T. Mimani, Curr. Opin. Solid Mat. Sci. 6 (2002) 507.
87. A. Ringuede, J. A. Labrincha, J. R. Frade, Solid State Ionics 141/142 (2001) 549.
88. C. N. Costa, A. M. Efstathiou, J. Phys. Chem. C 111 (2007) 3010.
89. P. G. Savva, J. Catal. 257 (2008) 324.

The invention claimed is:

1. A catalyst comprising platinum in an amount between 0.01 and 2.0 wt %, and palladium in an amount between 0.01 and 2.0 wt %, and wherein both metals are dispersed on a mixed metal oxide support of magnesium and cerium.

2. A catalyst according to claim 1, wherein platinum and palladium are dispersed on the mixed metal oxide support comprising each of magnesium oxide and cerium dioxide having a mean primary crystal size less than 15 nm.

3. A catalyst according to claim 2 further comprising at least two components selected from the group consisting of Pt, Pt—Pd alloy, $PtO_x$, PdO, MgO, and $CeO_2$.

4. A catalyst according to claim 1, wherein the metal content is 0.1 wt % of platinum and 0.05 wt % of palladium dispersed on the mixed metal oxide support of magnesium and cerium.

5. A catalyst according to claim 1 comprising platinum and palladium supported on a mixed metal oxide of 50 wt % magnesium oxide and 50 wt % cerium dioxide.

6. A catalyst according to claim 1 further comprising at least two components selected from the group consisting of Pt, Pt—Pd alloy, $PtO_x$, PdO, MgO, and $CeO_2$.

7. A catalyst comprising noble metals platinum and palladium in an amount between 0.01 and 2.0 wt % for each noble metal, wherein both metals are dispersed on a mixed metal oxide support of magnesium oxide and cerium dioxide solids, prepared by a process comprising the steps of:
  impregnating the mixed metal oxide of magnesium and cerium with an aqueous solution containing platinum and palladium precursors,
  evaporating water, drying, grinding and heating the precursors at a sufficient temperature in air flow until complete conversion of the platinum and palladium precursors into their respective metal oxides, and
  reducing the catalyst at a sufficient reduction temperature for a sufficient time in $H_2$ flow.

8. A catalyst according to claim 7, wherein platinum and palladium, are dispersed on magnesium oxide and cerium dioxide in a proportion 1:1 (w/w).

9. A catalyst according to claim 7, comprising magnesium oxide and cerium dioxide solids having primary crystal particles with mean diameters less than 15 nm.

10. A catalyst according to claim 9 comprising a preceding step of solution combustion with urea as a fuel and without the use of any other solvent to obtain nano-crystalline magnesium oxide and cerium dioxide support phases of less than 15 nm in size.

11. A catalyst according to claim 9 wherein platinum and palladium are dispersed as particles having a size less than 2 nm, in the mixed metal oxide.

12. A catalyst according to claim 7, wherein the mixed metal oxide of magnesium oxide and cerium dioxide is mixed in a first step with an aqueous solution containing only one noble metal from platinum and palladium precursors followed by steps of the evaporation of water, drying, grinding and heating at a sufficient temperature in air flow until complete conversion of the platinum or palladium precursor into the respective metal oxide, which is followed by the impregnation of the resulting solid material in a second step with an aqueous solution containing only that noble metal not used in the first step and by the same evaporation, drying, grinding and heating steps.

13. A catalyst according to claim 7 wherein platinum and palladium are dispersed as particles having a size less than 2 nm, in the mixed metal oxide.

14. A catalyst according to claim 7 comprising a preceding step of solution combustion with urea as a fuel and without the use of any other solvent to obtain nano-crystalline magnesium oxide and cerium dioxide support phases of less than 15 nm in size.

15. In a catalytic process for the reduction of a chemical compound selected from the group consisting of NO, $NO_2$ and/or a mixture of NO and $NO_2$ to $N_2$ gas, optionally with hydrogen as reducing agent, in the presence or absence of oxygen the improvement wherein the catalyst is according to claim 1.

16. In a catalytic process for the reduction of a chemical compound selected from the group consisting of NO, $NO_2$ and/or a mixture of NO and $NO_2$ to $N_2$ gas, optionally with hydrogen as reducing agent, in the presence or absence of oxygen, using a catalyst, the improvement wherein the catalyst is according to claim 2.

17. In a catalytic process for the reduction of a chemical compound selected from the group consisting of NO, $NO_2$ and/or a mixture of NO and $NO_2$ to $N_2$ gas, optionally with hydrogen as reducing agent, in the presence or absence of oxygen, using a catalyst, the improvement wherein the catalyst is according to claim 7.

18. In a catalytic process for the reduction of a chemical compound selected from the group consisting of NO, $NO_2$ and/or a mixture of NO and $NO_2$ to $N_2$ gas, optionally with hydrogen as reducing agent, in the presence or absence of oxygen, using a catalyst, the improvement wherein the catalyst is according to claim 9.

19. In a catalytic process for the reduction of a chemical compound selected from the group consisting of NO, $NO_2$ and/or a mixture of NO and $NO_2$ to $N_2$ gas, optionally with hydrogen as reducing agent, in the presence or absence of oxygen, using a catalyst, the improvement wherein the catalyst is according to claim 9.

20. In a catalytic process for the reduction of a chemical compound selected from the group consisting of NO, $NO_2$ and/or a mixture of NO and $NO_2$ to $N_2$ gas, optionally with hydrogen as reducing agent, in the presence or absence of oxygen, using a catalyst, the improvement wherein the catalyst is according to claim 10.

* * * * *